(12) United States Patent
Kanai (10) Patent No.: US 8,997,607 B2
(45) Date of Patent: Apr. 7, 2015

(54) WAVE GEAR DEVICE AND FLEXIBLE INTERNALLY TOOTHED GEAR

(75) Inventor: Satoru Kanai, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 60 days.

(21) Appl. No.: 13/820,666

(22) PCT Filed: May 31, 2012

(86) PCT No.: PCT/JP2012/003615
§ 371 (c)(1),
(2), (4) Date: Mar. 4, 2013

(87) PCT Pub. No.: WO2013/179354
PCT Pub. Date: Dec. 5, 2013

(65) Prior Publication Data
US 2013/0319151 A1 Dec. 5, 2013

(51) Int. Cl.
*F16H 49/00* (2006.01)
(52) U.S. Cl.
CPC .................................. *F16H 49/001* (2013.01)
(58) Field of Classification Search
CPC .............................. F16H 49/001; F16H 1/32
USPC ............................................ 74/640; 475/162
See application file for complete search history.

(56) References Cited

U.S. PATENT DOCUMENTS

| | | | |
|---|---|---|---|
| 3,001,840 A | | 9/1961 | Musser |
| 3,128,641 A | * | 4/1964 | Walton .......................... 74/640 |
| 3,196,713 A | * | 7/1965 | Robinson ...................... 74/640 |
| 4,969,376 A | * | 11/1990 | Fickelscher ................... 74/640 |
| 5,016,491 A | * | 5/1991 | Poro ............................... 74/640 |

FOREIGN PATENT DOCUMENTS

| | | |
|---|---|---|
| DE | 41 11 661 A1 | 10/1992 |
| JP | 5-141485 A | 6/1993 |
| JP | 5-141486 A | 6/1993 |
| JP | 2009-156462 A | 7/2009 |
| JP | 2009-257510 A | 11/2009 |
| JP | 2012-072912 A | 4/2012 |

OTHER PUBLICATIONS

International Search Report (PCT/ISA/210) issued on Aug. 14, 2012, by the Japanese Patent Office as the International Searching Authority for International Application No. PCT/JP2012/003615.

\* cited by examiner

*Primary Examiner* — William Kelleher
*Assistant Examiner* — Valentin Craciun
(74) *Attorney, Agent, or Firm* — Buchanan Ingersoll & Rooney PC (57) ABSTRACT

In a wave gear device, an annular rigid externally toothed gear is disposed on the inner side of a cup-shaped flexible internally toothed gear. An internal-tooth-formation portion of the flexible internally toothed gear and a pushed portion pushed by a wave generator and flexed ellipsoidally are formed in different positions along the center axis line. The wave generator is disposed on the inner side of the flexible internally toothed gear, the pushed cylindrical portion is pushed from the inner side to the outside along the radial direction thereof by the wave generator, whereby the pushed cylindrical portion is flexed ellipsodially. As the outside diameter dimension of the wave gear device is determined by that of the flexible internally toothed gear, a wave gear device having a small outside diameter dimension can be obtained.

13 Claims, 6 Drawing Sheets

FIG. 6

WAVE GEAR DEVICE AND FLEXIBLE INTERNALLY TOOTHED GEAR

TECHNICAL FIELD

The present invention relates to a wave gear device capable of effectively utilizing an external space of a flexible internally toothed gear thereof.

BACKGROUND ART

One known example of a wave gear device is what is known as a cup-type device, such as is disclosed in Patent Document 1. In this type of wave gear device, a flexible externally toothed gear disposed on the inside of a rigid externally toothed gear has a cup shape. The flexible externally toothed gear comprises a cylindrical barrel part capable of flexing in the radial direction, a diaphragm extending inward in the radial direction from one end of the barrel part, and a thick annular or discoid boss formed as a continuation of the internal peripheral edge of the diaphragm. The region on the side of the open edge, which is the side opposite the diaphragm in the cylindrical barrel part, is an external-tooth-formation portion, where external teeth are formed in the external peripheral surface.

The flexible externally toothed gear is made to flex into an ellipsoidal shape by an ellipsoidally contoured wave generator mounted to the inside of the external-tooth-formation portion, and the flexible externally toothed gear is partially meshed with the rigid internally toothed gear. When the wave generator is rotated, the meshing positions of the two gears move in the circumferential direction, and relative rotation occurs between the two gears, the rotation corresponding to the difference in the number of teeth between the two gears. One gear is fixed in place so as to not rotate, whereby reduced rotation is outputted from the other gear. The wave generator is configured from an annular rigid cam plate, and a wave bearing mounted to the ellipsoidally contoured external peripheral surface of the cam plate.

Another known example of a wave gear device is what is referred to as a silk-hat-type device such as is disclosed in Patent Document 2. In this type of wave gear device, a flexible externally toothed gear disposed on the inside of a rigid internally toothed gear has a silk hat shape. The flexible externally toothed gear comprises a cylindrical barrel part capable of flexing in the radial direction, a diaphragm extending outward in the radial direction from one end of the barrel part, and a thick annular boss formed as a continuation of the external peripheral edge of the diaphragm. The region on the side of the open edge, which is the side opposite the diaphragm in the cylindrical barrel part, is an external-tooth-formation portion, where external teeth are formed in the external peripheral surface.

The flexible externally toothed gear is made to flex into an ellipsoidal shape by an ellipsoidally contoured wave generator mounted to the inside of the external-tooth-formation portion, and the flexible externally toothed gear is partially meshed with the rigid internally toothed gear. When the wave generator is rotated, the meshing positions of the two gears move in the circumferential direction, and relative rotation occurs between the two gears, the rotation corresponding to the difference in the number of teeth between the two gears. One gear is fixed in place so as to not rotate, whereby reduced rotation is outputted from the other gear. The wave generator is configured from an annular rigid cam plate, and a wave bearing mounted to the ellipsoidally contoured external peripheral surface of the cam plate.

Yet another known example of a wave gear device is what is referred to as a flat-type device such as is disclosed in Patent Document 3. In this type of wave gear device, a flexible externally toothed gear disposed on the inside of a rigid internally toothed gear has a simple shape comprising a cylindrical barrel part capable of flexing in the radial direction, and external teeth formed on the circular external peripheral surface of the cylindrical barrel part.

Two rigid internally toothed gears are disposed in parallel on the outer side of the flexible externally toothed gear. The flexible externally toothed gear is made to flex into an ellipsoidal shape by the ellipsoidally contoured wave generator mounted to the inner side of the flexible externally toothed gear, and the flexible externally toothed gear is partially meshed with the rigid internally toothed gears. When the wave generator is rotated, the meshing positions of the flexible externally toothed gear and the two rigid internally toothed gears move in the circumferential direction. One rigid internally toothed gear has the same number of teeth as the flexible externally toothed gear, and the other rigid internally toothed gear has more teeth than the flexible externally toothed gear. Therefore, the flexible externally toothed gear rotates integrally with the rigid internally toothed gear that has the same number of teeth, and relative rotation occurs with the rigid internally toothed gear that has a different number of teeth, the rotation corresponding to the difference in the number of teeth between the two gears. One rigid internally toothed gear is fixed in place so as to not rotate, whereby reduced rotation is outputted from the other rigid internally toothed gear. The wave generator is configured from an annular rigid cam plate, and a wave bearing mounted to the ellipsoidally contoured external peripheral surface of the cam plate.

PRIOR ART DOCUMENTS

Patent Documents

[Patent Document 1] JP-A 2012-072912
[Patent Document 2] JP-A 2009-257510
[Patent Document 3] JP-A 2009-156462

SUMMARY OF INVENTION

Problems the Invention Intends to Solve

In a conventional cup-shaped wave gear device, the outside diameter dimension of the device is stipulated by the rigid internally toothed gear positioned farthest to the outside. The rigid internally toothed gear serves as a restriction, and there is a limit to reducing the outside diameter dimension of the cup-shaped wave gear device.

In conventional silk-hat-type wave gear device, a diaphragm extends radially outward from one end of a cylindrical barrel part in the silk-hat-shaped flexible externally toothed gear, and an annular boss is formed in the external peripheral edge of the diaphragm. A rigid internally toothed gear is disposed on the external side of the cylindrical barrel part. Thus, the diaphragm, the boss, and the rigid internally toothed gear are positioned on the side of the external peripheral portion of the cylindrical barrel part, and a large dead space forms readily in between these components.

In a conventional flat-type wave gear device, the outside diameter dimension of the device is stipulated by two rigid internally toothed gears disposed on the external side of a cylindrical flexible externally toothed gear. Therefore, similar to the case of a cup-shaped wave gear device, the rigid internally toothed gears serve as a restriction, and there is a limit to reducing the outside diameter dimension of the flat-type wave gear device.

An object of the present invention is to provide a cup-shaped wave gear device suitable for reducing an outside diameter dimension, and a cup-shaped flexible internally toothed gear.

Another object of the present invention is to provide a silk-hat-type wave gear device which can effectively utilize space in the external periphery, and a silk-hat-shaped flexible internally toothed gear.

Yet another object of the present invention is to provide a flat-type wave gear device suitable for reducing an outside diameter dimension, and a flexible internally toothed gear.

Means for Solving the Problems

In a wave gear device of the present invention, an internally toothed gear is a flexible internally toothed gear capable of flexing in a radial direction, an externally toothed gear is a rigid externally toothed gear, and the rigid externally toothed gear is disposed on the internal side of the flexible internally toothed gear. An internal-tooth-formation portion in the flexible internally toothed gear, and a pushed portion pushed by the wave generator and made to flex into an ellipsoidal shape in the flexible internally toothed gear, are formed in positions displaced along a center axis line of the flexible internally toothed gear. Furthermore, a wave generator is disposed on the inside of the flexible internally toothed gear, and the pushed portion is pushed radially outward from the inside by the wave generator, whereby the pushed portion is made to flex into an ellipsoidal shape.

Thus, in the present invention, the internal-tooth-formation portion and the pushed portion are formed in the cylindrical barrel part of the flexible internally toothed gear in different positions along the center axis line, positions that are typically adjacent to each other. Because the internal-tooth-formation portion and the pushed portion are displaced along the center axis line, the wave generator can be disposed on the inside of the cylindrical barrel part of the flexible internally toothed gear, similar to the rigid externally toothed gear, and the pushed portion can be pushed outward from the inside to cause the pushed portion to flex into an ellipsoidal shape. Because the cylindrical barrel part as a whole flexes into an ellipsoidal shape and the internal-tooth-formation portion also flexes into an ellipsoidal shape when the pushed portion is made to flex into an ellipsoidal shape, a state can be formed in which the internal teeth formed in the internal-tooth-formation portion partially mesh with the external teeth of the rigid externally toothed gear.

Effects of the Invention

In the wave gear device of the present invention, because the rigid externally toothed gear and the wave generator are disposed on the inside of the cylindrical barrel part of the flexible internally toothed gear, the external space of the cylindrical barrel part of the flexible internally toothed gear can be effectively utilized.

In the case of a cup-type wave gear device, the outside diameter dimension of the device is determined by the outside diameter dimension of the cup-shaped flexible internally toothed gear. Compared to a configuration in which a rigid gear is disposed on the outside of a flexible gear, it is easier to reduce the outside diameter dimension of the device, and the installation space is smaller.

In the case of a silk-hat-type wave gear device, because there are no gears or other structural components on the external periphery of the cylindrical barrel part of the silk-hat-shaped flexible internally toothed gear, the space in the external periphery is not left as dead space partitioned by the diaphragm, the boss, and the gears; this space can be effectively utilized as a space for installing components or the like.

In the case of a flat-type wave gear device, the outside diameter dimension of the device is determined by the outside diameter dimension of the cylindrical flexible internally toothed gear. Consequently, it is easy to reduce the outside diameter dimension of the device, and the installation space is smaller.

In the present invention, the rigid externally toothed gear and the wave generator, which are to be supplied with lubricant or coated with grease, are arrayed on the inside of the flexible externally toothed gear. Therefore, compared to conventional cases in which lubricated components are disposed on the outside and inside of a flexible gear, the range supplied with lubricant or the range coated with grease can be reduced, and these regions can be more easily lubricated.

BRIEF DESCRIPTION OF THE DRAWINGS

FIG. 1(a) is a schematic cross-sectional view showing an embodiment of a cup-type wave gear device to which the present invention is applied, and (b) is a schematic end surface view of the same;

FIG. 2(a) is a longitudinal cross-sectional view schematically showing the flexed state of the cup-shaped flexible internally toothed gear of FIG. 1, and (b) is a transverse cross-sectional view of the same;

FIG. 3(a) is a schematic longitudinal cross-sectional view showing an embodiment of a silk-hat-type wave gear device to which the present invention is applied, and (b) is a schematic end surface view of the same;

FIG. 4(a) is a longitudinal cross-sectional view schematically showing the flexed state of the silk-hat-shaped flexible internally toothed gear of FIG. 3, and (b) is a transverse cross-sectional view of the same;

FIG. 5(a) is a schematic longitudinal cross-sectional view showing an embodiment of a flat-type wave gear device to which the present invention is applied, and (b) is a schematic end surface view of the same.

MODE FOR CARRYING OUT THE INVENTION

An embodiment of a wave gear device to which the present invention is applied is described hereinbelow with reference to the drawings.

Embodiment 1

Cup-Shaped Wave Gear Device

FIG. 1(a) is a schematic cross-sectional view showing an embodiment of a cup-type wave gear device to which the present invention is applied, and (b) is a schematic end surface view of the same. In the drawings, a cup-type wave gear device 1 has a cup-shaped flexible internally toothed gear 2, an annular rigid externally toothed gear 3 disposed coaxially on the inner side of the internally toothed gear, and a wave generator 4 disposed in a position adjacent to the rigid externally toothed gear 3 on the inner side of the flexible internally toothed gear 2. The wave generator 4 causes the flexible internally toothed gear 2 to flex into an ellipsoidal shape, forming a state in which internal teeth 5 of the flexible internally toothed gear 2 mesh with external teeth 6 of the rigid externally toothed gear 3 at two locations (portions positioned on a short axis 28) separated 180 degrees in the circumferential direction.

When the wave generator 4 is rotated by a motor or another high-speed rotation drive source about a center axis line 1a of the wave gear device 1, the meshing positions of the internal teeth 5 in the external teeth 6 move in the circumferential direction. The number of internal teeth 5 is greater by 2n (n being a positive integer) than the number of external teeth 6. Commonly, there are two more internal teeth 5. Therefore, when the meshing positions of the gears 2, 3 move in the circumferential direction, relative rotation occurs between the two gears according to the difference in the number of teeth between the two gears. One gear is fixed so as to not rotate, and output rotation is acquired from the other gear.

The flexible internally toothed gear 2 includes a cylindrical barrel part 11 capable of flexing in the radial direction, a diaphragm 12 extending radially inward from one end 11a of the cylindrical barrel part 11, and a thick annular boss 13 formed as a continuation of the internal peripheral edge of the diaphragm 12. A plurality of bolt holes 14 are formed in the boss 13 at predetermined intervals along the circumferential direction, enabling the boss to be connected and fixed to a fixed-side member or a load-side member (not shown).

The cylindrical barrel part 11 has, along the center axis line 1a from the side of the diaphragm 12, a cylindrical portion 15 of a constant length, an internal-tooth-formation cylindrical portion 16 continuing from the cylindrical portion and having the internal teeth 5 formed thereon, and a pushed cylindrical portion 17 continuing from the internal-tooth-formation cylindrical portion. The distal end edge of the pushed cylindrical portion 17 constitutes another open edge 11b of the cylindrical barrel part 11 of the flexible internally toothed gear 2. The pushed cylindrical portion 17 is a portion pushed from the inside to the outside and made to flex into an ellipsoidal shape by the wave generator 4, as is described hereinafter.

The rigid externally toothed gear 3 is disposed concentrically on the inside of the internal-tooth-formation cylindrical portion 16. Bolt holes or the like are formed in the rigid externally toothed gear 3, enabling the rigid internally toothed gear to be connected and fixed to a fixed-side member or a load-side member (not shown).

The wave generator 4 is disposed in a position adjacent to the rigid externally toothed gear 3 on the side of the open edge 11b in the direction of the center axis line 1a, so as to be concentric with the inside of the pushed cylindrical portion 17 of the cylindrical barrel part 11. The wave generator 4 comprises a rigid annular member 21 and a wave bearing 22 attached to the outer side of the annular member. The external peripheral surface 23 of the annular member 21 is a surface of constant width having an ellipsoidal contour. The wave bearing 22 comprises an outer ring 24 and an inner ring 25 capable of flexing in the radial direction, which are attached to the ellipsoidally contoured external peripheral surface 23 and made to flex into an ellipsoidal shape, and balls 26 are inserted so as to be capable of rolling in the ellipsoidal trajectory formed between the rings. The pushed cylindrical portion 17 of the cylindrical barrel part 11 of the flexible internally toothed gear 2 is fitted on the external peripheral surface of the ellipsoidally flexed outer ring 24, and made to flex into an ellipsoidal shape.

Figure 2:
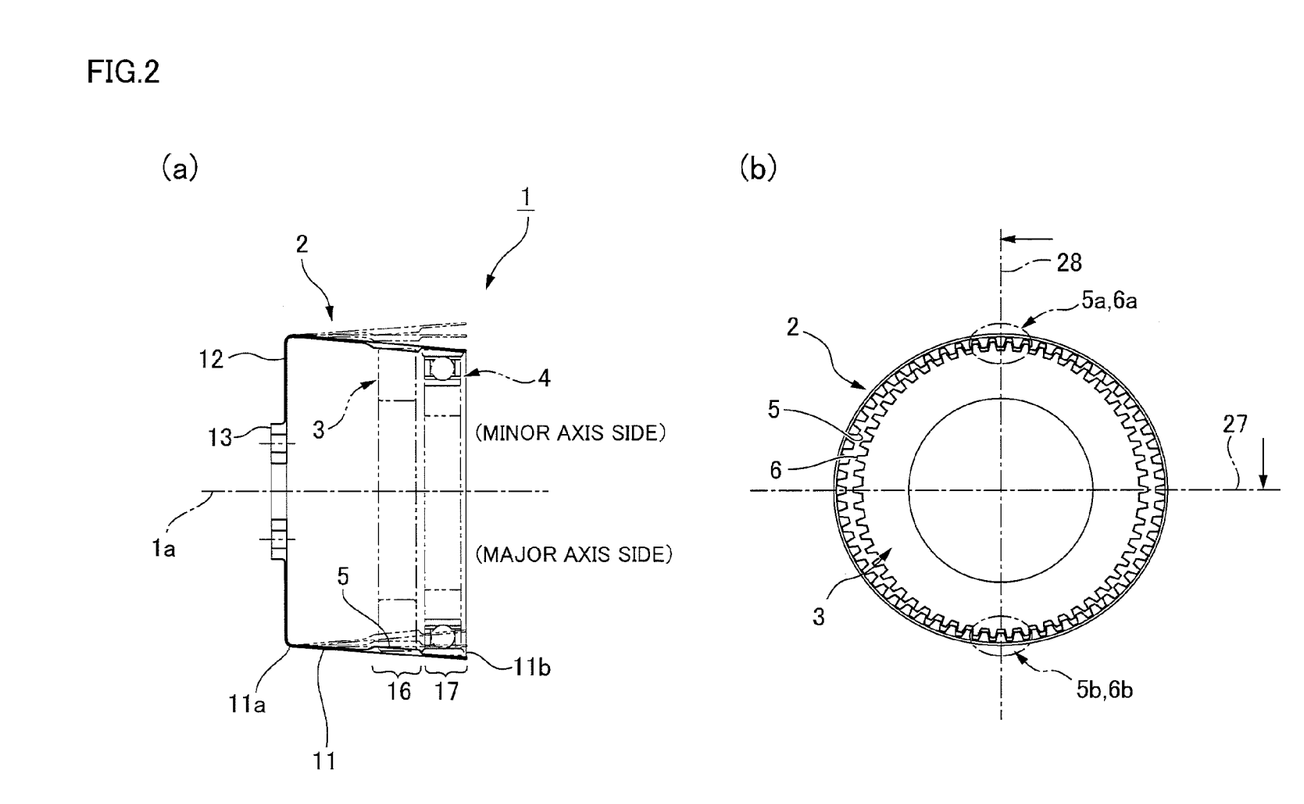

FIG. 2(a) is a longitudinal cross-sectional view schematically showing the flexed state of the flexible internally toothed gear 2, and FIG. 2(b) is a transverse cross-sectional view schematically showing the flexed state of the flexible internally toothed gear 2 and the meshed state with the rigid externally toothed gear 3. The pushed cylindrical portion 17 of the cylindrical barrel part 11 is pushed outward along the radius from the inside and made to flex into an ellipsoidal shape by the wave generator 4. The cylindrical barrel part 11 thereby flexes as a whole into an ellipsoidal shape. The amount of flexure increases according to the distance from the diaphragm 12, from the end 11a in the side having the diaphragm 12 toward the open edge 11b on the opposite side.

As shown in the bottom half portion of FIG. 2(a), the amount of flexure gradually increases in a positive direction according to the distance from the diaphragm 12 in a position on the major axis 27 of the ellipse, and as shown in the top half portion of the same drawing, the amount of flexure gradually increases in a negative direction in a position on the minor axis 28 of the ellipse. As a result, the internal-tooth-formation cylindrical portion 16 also flexes into an ellipsoidal shape, being adjacent to the pushed cylindrical portion 17 which is flexed into an ellipsoidal shape by the wave generator 4. Consequently, the internal teeth 5 of the internal-tooth-formation cylindrical portion 16 also flex into an ellipsoidal shape, and a state is formed in which internal teeth portions 5a, 5b in positions on the minor axis 28 are meshed with external teeth portions 6a, 6b in the rigid externally toothed gear 3.

Therefore, the wave generator 4 disposed on the inner side of the flexible internally toothed gear 2 functions in the same manner as a wave generator disposed in a position facing the rigid externally toothed gear 3 in the outer side of the flexible internally toothed gear 2.

Figure 1:
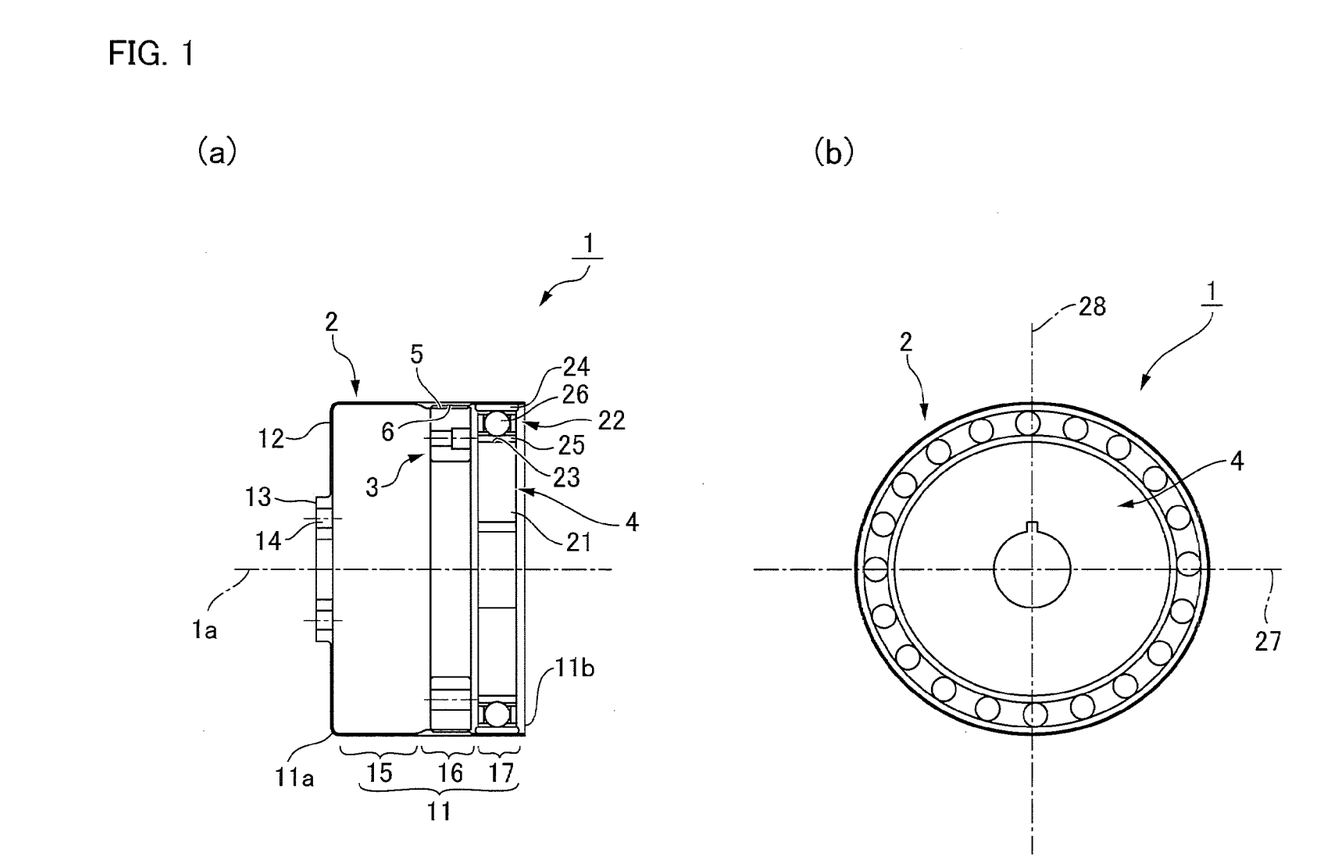

Referring again to FIG. 1, in the cup-type wave gear device 1 configured in this manner, structural components of the wave gear device 1 are not disposed on the outer side of the cup-shaped flexible internally toothed gear 2. Therefore, because the outside diameter dimension of the wave gear device 1 is determined by the outside diameter dimension of the flexible internally toothed gear 2, a wave gear device having a small outside diameter can be obtained. The space on the external periphery of the flexible internally toothed gear 2 can also be effectively utilized.

The rigid externally toothed gear 3 and the wave generator 4 are disposed in adjacent positions on the inner side of the flexible internally toothed gear 2. Therefore, the grease-coated range is smaller than in cases in which these components are disposed separately on the outer side and inner side of the flexible internally toothed gear 2. Consequently, these components can be lubricated efficiently.

In the example above, relative to the internal-tooth-formation cylindrical portion 16, the pushed cylindrical portion 17 is formed in the side having the open edge 11b. The pushed cylindrical portion 17 can also be disposed in the diaphragm 12 side of the internal-tooth-formation cylindrical portion 16. It is also possible for the pushed cylindrical portion 17 to be formed separated from the internal-tooth-formation cylindrical portion 16 by a predetermined distance in the direction of the center axis line 1a.

Embodiment 2

Silk-Hat-Type Wave Gear Device

FIG. 3(a) is a schematic cross-sectional view showing an embodiment of a silk-hat-type wave gear device to which the present invention is applied, and (b) is a schematic end surface view of the same. In the drawings, a silk-hat-type wave gear device 31 has a silk-hat-shaped flexible internally toothed gear 32, a rigid externally toothed gear 33 disposed coaxially on the inner side of the internally toothed gear, and a wave generator 34 disposed in a position adjacent to the rigid externally toothed gear 33 on the inner side of the flexible internally toothed gear 32. The wave generator 4 causes the flexible internally toothed gear 32 to flex into an ellipsoidal shape, forming a state in which internal teeth 35 of the flexible internally toothed gear 32 mesh with external teeth 36 of the rigid externally toothed gear 33 at two locations (portions positioned on a short axis) separated 180 degrees in the circumferential direction.

When the wave generator 34 is rotated by a motor or another high-speed rotation drive source about a center axis line 31a of the wave gear device 31, the meshing positions of the internal teeth 35 in the external teeth 36 move in the circumferential direction. The number of internal teeth 35 is greater by 2n (n being a positive integer) than the number of external teeth 36. Commonly, there are two more internal teeth 35. Therefore, when the meshing positions of the gears 32, 33 move in the circumferential direction, relative rotation occurs between the two gears according to the difference in the number of teeth between the two gears. One gear is fixed so as to not rotate, and output rotation is acquired from the other gear.

The flexible internally toothed gear 32 includes a cylindrical barrel part 41 capable of flexing in the radial direction, a diaphragm 42 extending radially outward from one end 41a of the cylindrical barrel part 41, and a thick annular boss 43 formed as a continuation of the external peripheral edge of the diaphragm 42. A plurality of bolt holes 44 are formed in the boss 43 at predetermined intervals along the circumferential direction, enabling the boss to be connected and fixed to a fixed-side member or a load-side member (not shown).

The cylindrical barrel part 41 has, along the center axis line 31a from the side of the diaphragm 42, a cylindrical portion 45 of a constant length, an internal-tooth-formation cylindrical portion 46 continuing from the cylindrical portion and having the internal teeth 35 formed thereon, and a pushed cylindrical portion 47 continuing from the internal-tooth-formation cylindrical portion. The distal end edge of the pushed cylindrical portion 47 constitutes another open edge 41b of the cylindrical barrel part 41 of the flexible internally toothed gear 32. The pushed cylindrical portion 47 is a portion pushed from the inside to the outside and made to flex into an ellipsoidal shape by the wave generator 34, as is described hereinafter.

The rigid externally toothed gear 33 is disposed concentrically on the inside of the internal-tooth-formation cylindrical portion 46. Bolt holes or the like are formed in the rigid externally toothed gear 33, enabling the rigid internally toothed gear to be connected and fixed to a fixed-side member or a load-side member (not shown).

The wave generator 34 is disposed in a position adjacent to the rigid externally toothed gear 33 on the side of the open edge 41b in the direction of the center axis line 31a, so as to be concentric with the inside of the pushed cylindrical portion 47 of the cylindrical barrel part 41. The wave generator 34 comprises a rigid annular member 51 and a wave bearing 52 attached to the outer side of the annular member. The external peripheral surface 53 of the annular member 51 is a surface of constant width having an ellipsoidal contour. The wave bearing 52 comprises an outer ring 54 and an inner ring 55 capable of flexing in the radial direction, which are attached to the ellipsoidally contoured external peripheral surface 53 and made to flex into an ellipsoidal shape, and balls 56 are inserted so as to be capable of rolling in the ellipsoidal trajectory formed between the rings. The pushed cylindrical portion 47 of the cylindrical barrel part 41 of the flexible internally toothed gear 32 is fitted on the external peripheral surface of the ellipsoidally flexed outer ring 54, and made to flex into an ellipsoidal shape.

Figure 4:
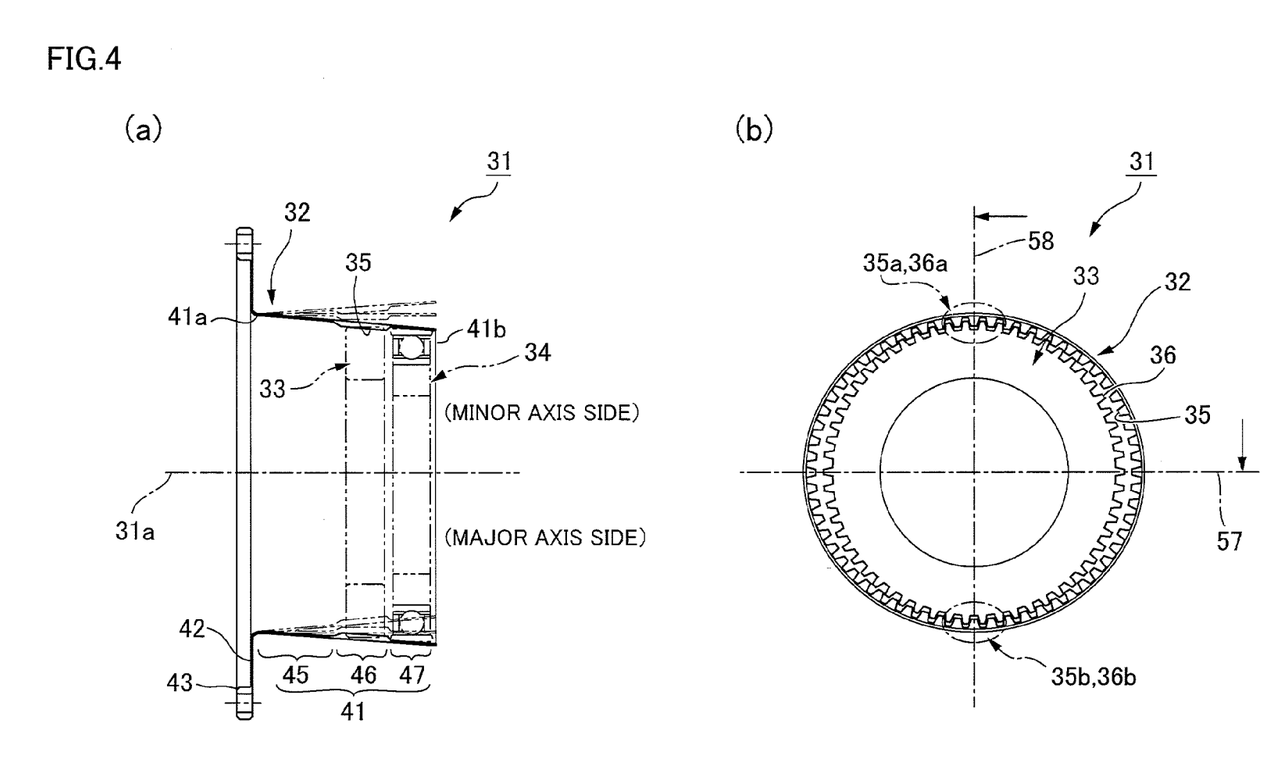

FIG. 4(a) is a longitudinal cross-sectional view schematically showing the flexed state of the flexible internally toothed gear32, and FIG. 4(b) is a transverse cross-sectional view schematically showing the flexed state of the flexible internally toothed gear 32 and the meshed state with the rigid externally toothed gear 33. The pushed cylindrical portion 47 of the cylindrical barrel part 41 is pushed outward along the radius from the inside and made to flex into an ellipsoidal shape by the wave generator 34. The cylindrical barrel part 41 thereby flexes as a whole into an ellipsoidal shape. The amount of flexure increases according to the distance from the diaphragm 42, from the end 41a in the side having the diaphragm 42 toward the open edge 41b on the opposite side.

As shown in the bottom half portion of FIG. 4(a), the amount of flexure gradually increases in a positive direction according to the distance from the diaphragm 42 in a position on the major axis 57 of the ellipse, and as shown in the top half portion of the same drawing, the amount of flexure gradually increases in a negative direction in a position on the minor axis 58 of the ellipse. As a result, the internal-tooth-formation cylindrical portion 46 also flexes into an ellipsoidal shape, being adjacent to the pushed cylindrical portion 47 which is flexed into an ellipsoidal shape by the wave generator 34. Consequently, the internal teeth 36 of the internal-tooth-formation cylindrical portion 46 also flex into an ellipsoidal shape, and a state is formed in which internal teeth portions 35a, 35b in positions on the minor axis 58 are meshed with external teeth portions 36a, 36b in the rigid externally toothed gear 33.

Therefore, the wave generator 34 disposed on the inner side of the flexible internally toothed gear 32 functions in the same manner as a conventional wave generator disposed in a position facing the rigid externally toothed gear 33 in the outer side of the flexible internally toothed gear 32.

Figure 3:
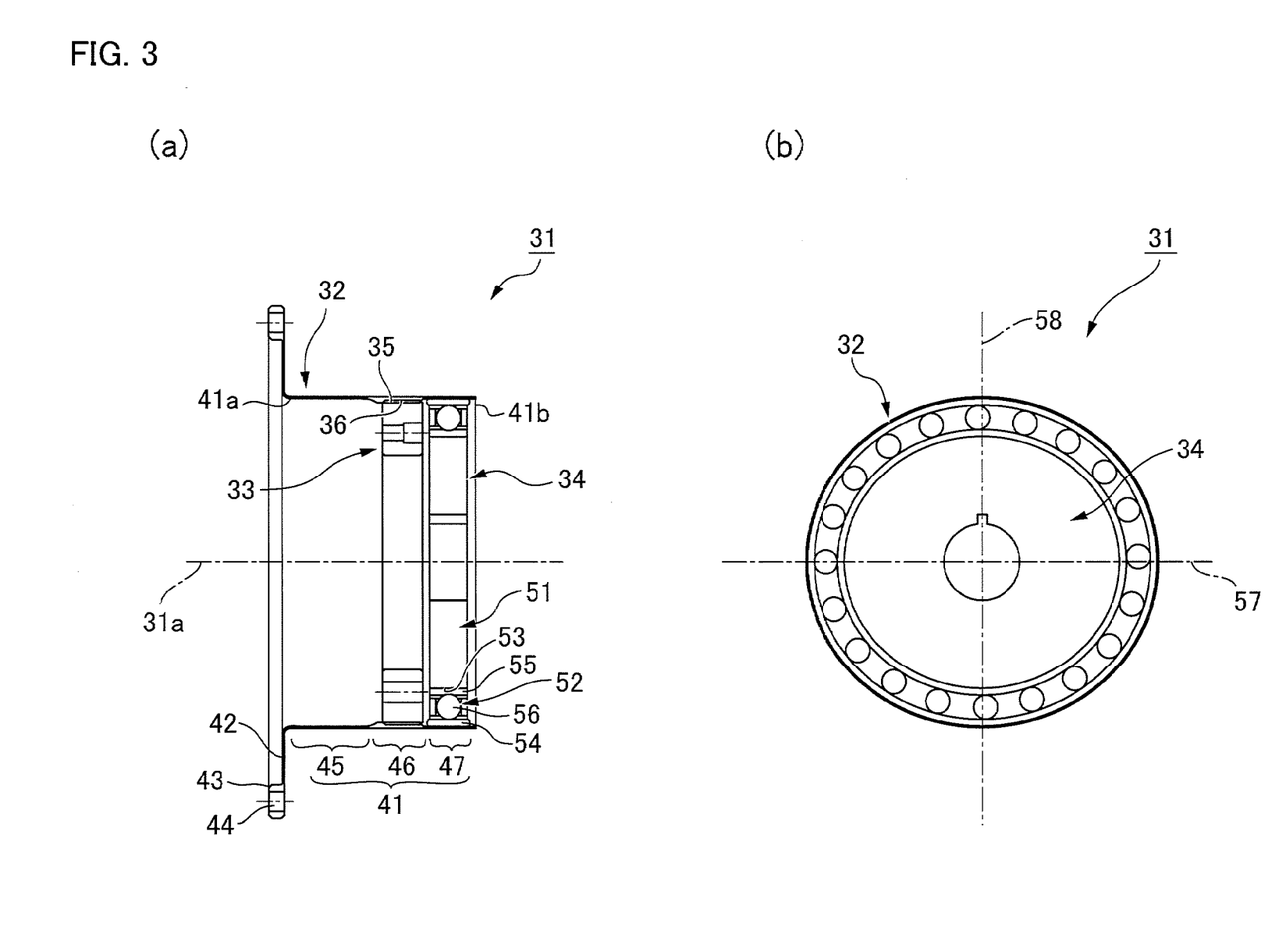

Referring again to FIG. 3, in the silk-hat-type wave gear device 31 configured in this manner, the rigid externally toothed gear 33 and the wave generator 34 are disposed on the inner side of the flexible internally toothed gear 32. Therefore, the space on the external periphery of the flexible internally toothed gear 32 can be effectively utilized for installing pats, wiring and others.

Furthermore, the rigid externally toothed gear 33 and the wave generator 34 are disposed in adjacent positions on the inner side of the flexible internally toothed gear 32. Therefore, the grease-coated range is smaller than in cases in which these components are disposed separately on the outer side and inner side of the flexible internally toothed gear 32. Consequently, these components can be lubricated efficiently.

In the example above, the wave generator 34 is disposed in the side having the open edge 41b of the flexible internally toothed gear 32 with respect to the rigid externally toothed gear 33. Instead, it is possible to arrange the wave generator 34 in the diaphragm 42 side of the flexible internally toothed gear 32 with respect to the rigid externally toothed gear 33. In other words, relative to the internal-tooth-formation cylindrical portion 46, the pushed cylindrical portion 47 is formed in the diaphragm 12 side of the internal-tooth-formation cylindrical portion 46. It is also possible for the pushed cylindrical portion 47 to be formed separated from the internal-toothformation cylindrical portion 46 by a predetermined distance in the direction of the center axis line 31a.

Embodiment 3

Flat-Type Hollow Wave Gear Device

FIG. 5(a) is a schematic longitudinal cross-sectional view showing an embodiment of a flat-type wave gear device to which the present invention is applied, and (b) is a schematic end surface view of the same. Referring to these drawings for the description, a flat-type hollow wave gear device 61 has a cylindrical flexible internally toothed gear 62, annular first and second rigid externally toothed gears 63S, 63D disposed in parallel on the inner side of the flexible internally toothed gear, and first and second wave generators 64(1), 64(2) disposed coaxially on the inner side of the flexible internally toothed gear 62.

The first and second wave generators 64(1), 64(2), which sandwich the first and second rigid externally toothed gears 63S, 63D, are disposed adjacent to either side thereof. The first wave generator 64(1) is disposed adjacent to one side of the first rigid externally toothed gear 63S along a center axis line 61a, and the second wave generator 64(2) is disposed adjacent to the other side of the second rigid externally toothed gear 63D along the center axis line 61a. The first and second wave generators 64(1), 64(2) cause the flexible internally toothed gear 62 to flex into an ellipsoidal shape, forming a state in which the internal teeth 65 of the flexible internally toothed gear 62 mesh with external teeth 66S, 66D of the first and second rigid externally toothed gears 63S, 63D at two locations (portions positioned on a minor axis) separated 180 degrees in the circumferential direction.

When the first and second wave generators 64(1), 64(2) are integrally rotated about the center axis line 61a of the hollow wave gear device 61 by a motor or another high-speed rotation drive source, the positions where the internal teeth 65 mesh with the external teeth 66S, 66D move in the circumferential direction. The number of internal teeth 65 is the same as the number of external teeth 66D, but is greater by 2n (n being a positive integer), commonly two, than the number of external teeth 66S. Therefore, the second rigid externally toothed gear 63D rotates integrally with the flexible internally toothed gear 62. When the meshing positions of the first rigid externally toothed gear 63S and the flexible internally toothed gear 62 move in the circumferential direction, relative rotation occurs between the two gears according to the difference in the number of teeth between the two gears. For example, when the first rigid externally toothed gear 63S is fixed so as to not rotate, the other second rigid externally toothed gear 63D rotates integrally with the flexible internally toothed gear 62, and output rotation is therefore acquired from the second rigid externally toothed gear.

The flexible internally toothed gear 62 includes a cylindrical barrel part 71 capable of flexing in the radial direction, and the sides of the cylindrical barrel part 71 constitute first and second open edges 71a, 71b. From the side having the first open edge 71a along the direction of the center axis line 61a, the cylindrical barrel part 71 has a first pushed cylindrical portion 77(1) of a constant length, an internal-tooth-formation cylindrical portion 76 in which the internal teeth 65 are formed, and a second pushed cylindrical portion 77(2), the distal end edge of the second pushed cylindrical portion 77(2) being the other open edge 71b. The first pushed cylindrical portion 77(1) is a portion pushed from the inside to the outside and made to flex into an ellipsoidal shape by the first wave generator 64(1) as is described hereinafter, and the second pushed cylindrical portion 77(2) is a portion pushed from the inside to the outside and made to flex into an ellipsoidal shape by the second wave generator 64(2).

The first and second rigid externally toothed gears 63S, 63D are disposed adjacent to each other in a concentric manner on the inner side of the internal-tooth-formation cylindrical portion 76. Both the first and second rigid externally toothed gears 63S, 63D can be connected and fixed to a fixed-side member or a load-side member (not shown).

The first and second wave generators 64(1), 64(2), which have the same configuration, are disposed in positions adjacent to the sides of the first and second rigid externally toothed gears 63S, 63D that face the open edges 71a, 71b, respectively, and are disposed concentrically with each other on the inner sides of the first and second pushed cylindrical portions 77(1), 77(2) of the cylindrical barrel part 71. The first and second wave generators 64(1), 64(2) rotate integrally with each other at the same speed and in the same direction.

Each of the wave generators 64(1), 64(2) has a rigid annular member 81 and a wave bearing 82 attached on the outer side of the annular member. The external peripheral surface 83 of the annular member 81 is a surface of a constant width having an ellipsoidal contour. The wave bearing 82 comprises an outer ring 84 and an inner ring 85 capable of flexing in the radial direction, which are attached to the ellipsoidally contoured external peripheral surface 83 and made to flex into an ellipsoidal shape, and balls 86 are inserted so as to be capable of rolling in the ellipsoidal trajectory formed between the rings. The first and second pushed cylindrical portions 77(1), 77(2) of the cylindrical barrel part 71 of the flexible internally toothed gear 62 are fitted in into the respective external peripheral surfaces of the ellipsoidally flexed outer rings 84, and made to flex into an ellipsoidal shape.

Figure 5:
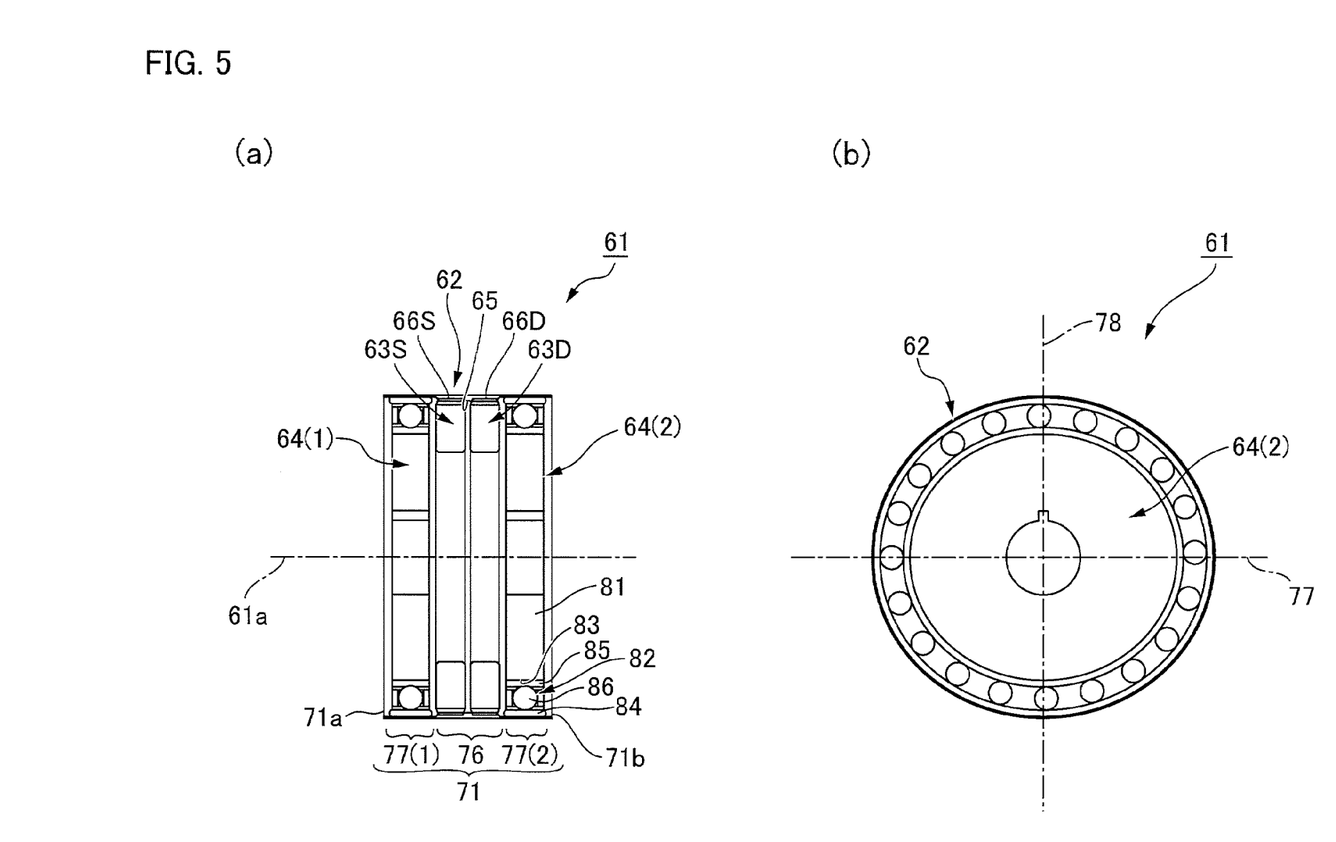
Figure 6:
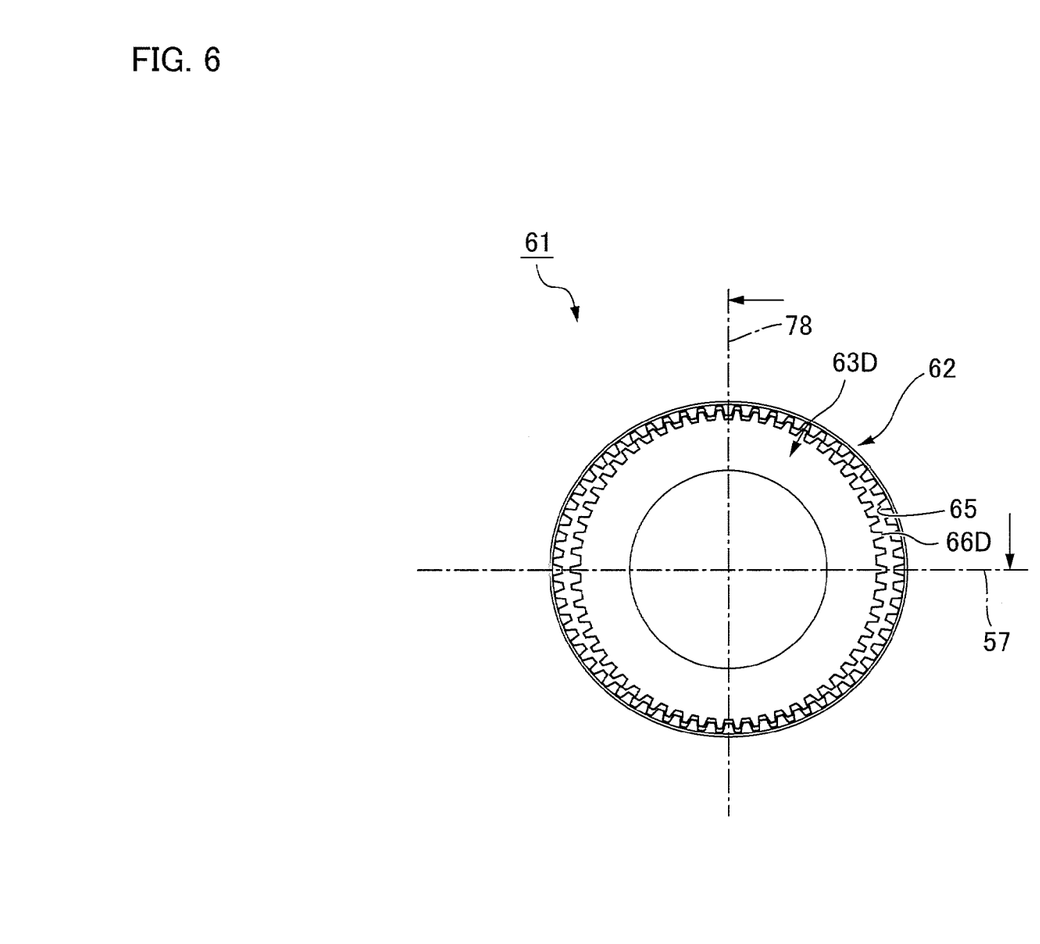
FIG. 6 is a transverse cross-sectional view schematically showing the flexed state of the flat-shaped flexible internally toothed gear of FIG. 5.

FIG. 6 is a transverse cross-sectional view schematically showing the flexed state of the flexible internally toothed gear 62 and the meshed state with the second rigid externally toothed gear 63D. The first and second pushed cylindrical portions 77(1), 77(2) of the cylindrical barrel part 71 are pushed from the inside of the radial direction to the outside and made to flex into an ellipsoidal shape respectively by the first and second wave generators 64(1), 64(2), as can be seen in FIGS. 5(a) and 6. The pushed cylindrical portions thereby flex into the same ellipsoidal shape in positions along the center axis line 61a of the cylindrical barrel part 71.

Therefore, the first and second wave generators 64(1), 64(2) disposed on the inner side of the flexible internally toothed gear 62 function in the same manner as a wave generator disposed in a position facing the first and second rigid externally toothed gears 63S, 63D in the inner side of the flexible internally toothed gear 62 as in conventional practice.

Referring again to FIG. 5, with the flat-type hollow wave gear device 61 configured in this manner, no structural components of the hollow wave gear device 61 are disposed on the outer side of the cylindrical flexible internally toothed gear 62. The outside diameter dimension of the hollow wave gear device 61 is therefore determined by the outside diameter dimension of the flexible internally toothed gear 62, and a wave gear device of a small outside diameter can therefore be obtained. The space on the external peripheral side of the flexible internally toothed gear 2 can also be efficiently utilized.

The first and second rigid externally toothed gears 63S, 63D and the first and second wave generators 64(1), 64(2) are disposed in parallel on the outer side of the flexible internally toothed gear 62. Therefore, the grease-coated range is smaller than in cases in which these components are disposed on the outer side and inner side of the flexible internally toothed gear 62. Consequently, these components can be lubricated efficiently.

In the example above, the pushed cylindrical portions 77(1), 77(2) are disposed adjacently on both sides of the internal-tooth-formation cylindrical portion 76. These portions can also be disposed as being spaced apart from each other. Another possibility is to omit one pushed cylindrical portion and its corresponding wave generator, and to employ a configuration comprising a single pushed cylindrical portion and a single wave generator.

The invention claimed is:

1. A wave gear device comprising:
   a flexible internally toothed gear;
   a rigid externally toothed gear disposed on an inner side of the flexible internally toothed gear and configured to function as a rotation output member; and,
   a wave generator for flexing the flexible internally toothed gear into an ellipsoidal shape to mesh partially with the rigid externally toothed gear, and for moving meshing positions of the two gears in a circumferential direction, wherein
   the flexible internally toothed gear has a cylindrical barrel part capable of flexing in a radial direction thereof, at least one end of the cylindrical barrel part being an open edge,
   the cylindrical barrel part has an outer peripheral surface with no external teeth and an inner peripheral surface including an internal-tooth-formation portion and a pushed portion, the internal-tooth-formation portion where internal teeth are formed, and the pushed portion pushed by the wave generator so as to flex the internal-tooth-formation portion into an ellipsoidal shape,
   the internal-tooth-formation portion and the pushed portion are formed in different positions of the inner peripheral surface of the cylindrical barrel part when viewed along a direction of a center axis line of the flexible internally toothed gear,
   the wave generator is disposed on an inner side of the cylindrical barrel part, and pushes the pushed portion in a radial direction thereof from an inner side toward an outer side to flex it elliptically, and
   wherein no structural components of the wave gear device are located on a radially outward side of the flexible internally toothed gear.

2. The wave gear device according to claim 1, wherein
   the internal-tooth-formation portion and the pushed portion are formed in positions adjacent to each other in the direction of the center axis line.

3. The wave gear device according to claim 2, wherein
   the pushed portion is a portion having a predetermined length in the direction of the center axis line from the open edge of the cylindrical barrel part.

4. The wave gear device according to claim 1, wherein
   the wave generator comprises a rigid member having an outer peripheral surface of an ellipsoidal contour, and a wave bearing attached on the outer peripheral surface in an ellipsoidally flexed state, and
   the pushed portion of the cylindrical barrel part is flexed ellipsoidally by the outer peripheral surface of an outer ring of the wave bearing.

5. The wave gear device according to claim 1, wherein
   the flexible internally toothed gear is a cup-shaped flexible internally toothed gear wherein a diaphragm extends inward in a radial direction from the other end of the cylindrical barrel part.

6. The wave gear device according to claim 1, wherein
   the rigid externally toothed gear includes a first rigid externally toothed gear having a same number of teeth as that of the flexible internally toothed gear and a second rigid externally toothed gear having a larger number of teeth than that of the flexible internally toothed gear, wherein the first and second rigid externally toothed gears are disposed concentrically and adjacent to each other in the center axis line,
   the cylindrical barrel part includes a second open edge on another side of the cylindrical barrel part,
   the pushed portion of the cylindrical barrel part includes a first pushed portion and a second pushed portion formed on both sides of the internal-tooth-formation portion so as to sandwich the internal-tooth-formation portion between them, and
   the wave generator includes a first wave generator for pushing the first pushed portion from an inner side in a radial direction thereof to an outer side, to thereby flex it into an ellipsoidal shape, and a second wave generator for pushing the second pushed portion from an inner side in a radial direction thereof to an outer side, to thereby flex it into an ellipsoidal shape.

7. A flexible internally toothed gear of the wave gear device according to claim 1, further comprising:
   a diaphragm extending outward or inward in a radial direction from the other edge of the cylindrical barrel part.

8. The flexible internally toothed gear of the wave gear device according to claim 7, wherein
   the internal-tooth-formation portion and the pushed portion are formed in positions adjacent to each other along the center axis line.

9. The flexible internally toothed gear of the wave gear device according to claim 8, wherein
   the pushed portion is a portion having a predetermined length in the direction of the center axis line from the open edge of the cylindrical barrel part.

10. The flexible internally toothed gear of the wave gear device according to claim 7, wherein
    a cup shape is formed by extending the diaphragm inward in the radial direction from the other end of the cylindrical barrel part.

11. A flexible internally toothed gear of the wave gear device according to claim 1, further comprising:
    a second open edge formed on another end of the cylindrical barrel part, wherein
    the pushed portion includes a first pushed portion and a second pushed portion formed on both sides of the internal-tooth-formation portion in the cylindrical barrel part along the direction of the center axis line.

12. The flexible internally toothed gear of the wave gear device according to claim 11, wherein
    the first pushed portion and the second pushed portion are respectively formed in positions adjacent to the internal-tooth-formation portion along the center axis line.

13. The flexible internally toothed gear of the wave gear device according to claim 12, wherein
    the first pushed portion is a portion having a predetermined length in the direction of the center axis line from the first open edge of the cylindrical barrel part, and
    the second pushed portion is a portion having a predetermined length in the direction of the center axis line from the second open edge of the cylindrical barrel part.

* * * * *